US011739430B2

(12) United States Patent
Fraccalvieri et al.

(10) Patent No.: US 11,739,430 B2
(45) Date of Patent: Aug. 29, 2023

(54) GAS PRODUCING SYSTEM FROM A LIQUID OR SOLID SOURCE OR ELEMENTS BY USING ELECTROMAGNETIC OR ELECTROSTATIC SIMULTANEOUS ANTI-POLAR PULSES, AND MECHANICAL PULSES

(71) Applicant: HYENERGY, LLC

(72) Inventors: Adolfo Gustavo Fraccalvieri, Buenos Aires (AR); Tulio Benjamin Garcia Ocana, Buenos Aires (AR); Domingo Fernandez y Rajo, Buenos Aires (AR)

( * ) Notice: Subject to any disclaimer, the term of this patent is extended or adjusted under 35 U.S.C. 154(b) by 386 days.

(21) Appl. No.: 17/064,300

(22) Filed: Oct. 6, 2020

(65) Prior Publication Data

US 2022/0106690 A1 Apr. 7, 2022

(51) Int. Cl.
*C25B 11/04* (2021.01)
*C25B 1/04* (2021.01)
(Continued)

(52) U.S. Cl.
CPC ........... *C25B 1/04* (2013.01); *B01J 7/00* (2013.01); *B01J 19/087* (2013.01); *B01J 19/10* (2013.01);
(Continued)

(58) Field of Classification Search
CPC ......... C25B 1/04; C25B 11/073; C25B 11/00; B01J 7/00; B01J 19/087; B01J 19/10; B01J 19/12; B01J 2219/0803; B01J 2219/0807; B01J 2219/0854; B01J 2219/0862; B01J 2219/0879; B01J 19/121; B01J 19/26; B01J 19/123; B01J 19/126; B01J 19/129; B01J 2219/0869; B01J 2219/1943; B01J 2219/182; B01J 2219/0892; B01J 2219/0875; H02K 7/1815; H02K 7/116; H02K 49/108; H02K 7/20; H02K 7/02; H02K 7/025; H02J 3/32; H02J 3/30; F16F 15/315; F16F 2222/06; H02N 15/00; Y02P 20/133; Y02E 60/36; F02M 21/0239; F02M 21/0209; F02B 2043/106; F02B 43/10; C01B 3/042; C01B 13/0207
See application file for complete search history.

(56) References Cited

U.S. PATENT DOCUMENTS

| 10,900,540 B1* | 1/2021 | Bica ...................... H02K 7/1815 |
| 2007/0183942 A1* | 8/2007 | Austin ................... B01J 19/121 |
| | | 422/186 |

* cited by examiner

*Primary Examiner* — Xiuyu Tai
(74) *Attorney, Agent, or Firm* — Jerold I. Schneider; Schneider IP Law

(57) ABSTRACT

A system to generate gases from a liquid or a solid source including a generator, a dual arbitrary generator, a turbine, a thermoelectric generator, a pulse-width modulation device, a suction pump, a radiolytic cell, and magnets. The radiolytic cell includes a body, a first disk, a second disk having a plurality of perforations, and a plurality of radiotrodes. Each radiotrodes includes a large diameter tube, a small diameter tube concentric with the large diameter tube, and metallic wires having an end fixed into an upper section of the large and small diameter tubes and to lower sections of the large and small diameter tubes. The second ends of each one of the metallic wires are connected into the perforations of the corresponding first disk or second disk. The radiotrodes hang up inside the radiolytic cells by the metallic wires producing movement or vibration of the radiotrodes inside the radiolytic cell.

5 Claims, 14 Drawing Sheets

(51) Int. Cl.
*C25B 11/00* (2021.01)
*C25B 11/073* (2021.01)
*B01J 7/00* (2006.01)
*B01J 19/08* (2006.01)
*B01J 19/12* (2006.01)
*B01J 19/10* (2006.01)

(52) U.S. Cl.
CPC ............... *B01J 19/12* (2013.01); *C25B 11/00* (2013.01); *C25B 11/073* (2021.01); *B01J 2219/0803* (2013.01); *B01J 2219/0807* (2013.01); *B01J 2219/0854* (2013.01); *B01J 2219/0862* (2013.01); *B01J 2219/0877* (2013.01); *B01J 2219/0879* (2013.01)

GAS PRODUCING SYSTEM FROM A LIQUID OR SOLID SOURCE OR ELEMENTS BY USING ELECTROMAGNETIC OR ELECTROSTATIC SIMULTANEOUS ANTI-POLAR PULSES, AND MECHANICAL PULSES

FIELD OF THE INVENTION

The present invention relates to a gas producing system. More specifically, the present invention relates to a gas producing system from a liquid or solid source or elements by using electromagnetic or electrostatic simultaneous anti-polar pulses, and mechanical pulses.

BACKGROUND OF THE INVENTION

The fossil fuel burned on the world's roads emits 1,730,000,000 metric tons of carbon dioxide into the atmosphere each year. This situation creates an increasing pollution problem.

The high levels of pollution are causing serious problems in nature and for the living beings of our planet, and in the near future, the use of fossil fuels as an energy source will not be possible.

There is a need for a device and process capable of generating an alternative fuel source with much less polluting and also to improve the consumption or combustion of traditional fossil fuels, in a hybrid technology way.

The prior art shows a system for producing gases by the disassociation of the water molecules accomplished most commonly by electrolysis or photolysis. Unfortunately, the energy required to obtain hydrogen as a fuel is cost prohibitive, since the energy required to produce the $H_2$ fuel has been greater than the energy provided by the $H_2$ fuel produced.

In addition, the prior art shows a device that uses electromagnetic radiation to break down the water molecules to obtain hydrogen and oxygen atoms. The device uses a circulation of electromagnetic pulses and a current with a DC current voltage pulsed at a repeat rate (frequency) that coincides with the resonant wavelength.

For strong electromagnetic fields to be created in part (the electrode), it must accumulate electrical potential. The stronger that electrical potential is, the stronger the electromagnetic fields and electromagnetic radiation will also be. If the electrical charge escapes from the part (the electrode), passing through the liquid to the other part, electromagnetic radiation either does not occur, or is very weak.

The device of the prior art was not able to generate powerful electromagnetic radiation, the inventor had to resort unfailingly to "tune" the magnetic radiation, with the frequency of natural resonance of the liquid particles. For which he had to resort to complex electronic devices. Otherwise your invention would not produce gas, in the necessary quantities.

There is a need for a system and method to obtain hydrogen from water which provides higher gas purity, with lower equipment and maintenance costs and that with less electrical energy, it is capable of generating more gas. In addition, there is a need for a system in which the electric energy is applied in a more efficient way.

SUMMARY OF THE INVENTION

The present invention relates to a system to generate gases from a liquid or a solid source including a generator, a dual arbitrary generator, a turbine, a thermoelectric generator, a pulse-width modulation device, a suction pump, a radiolytic cell, and magnets. The radiolytic cell includes a body, a first disk, a second disk having a plurality of perforations, and a plurality of radiotrodes. Each radiotrodes includes a large diameter tube, a small diameter tube concentric with the large diameter tube, and metallic wires having an end fixed into an upper section of the large and small diameter tubes and to lower sections of the large and small diameter tubes. The second ends of each one of the metallic wires are connected into the perforations of the corresponding first disk or second disk. The radiotrodes hang up inside the electrolytic cells by the metallic wires producing movement or vibration of the radiotrodes inside the radiolytic cell. The first pole on each one of the radiotrodes emits on the opposite wave of a second pole of the radiotrodes, producing the lysis of molecules of the liquid or the solid.

It is one of the features of the invention that pulses are negative and positive and both are executed at the same time.

DETAILED DESCRIPTION OF THE INVENTION

The system 10 according to the present invention may be connected to motor vehicles in general (including trucks), agricultural machinery and equipment, vessels, road machines, equipment and/or power generators from fossil fuel, and to any type of combustion machine and/or engine.

The system 10 generates gases from a liquid or solid source by using bursts of electromagnetic and mechanical pulses. These gases may be combustible, oxidizing or noble gases.

Figure 1:
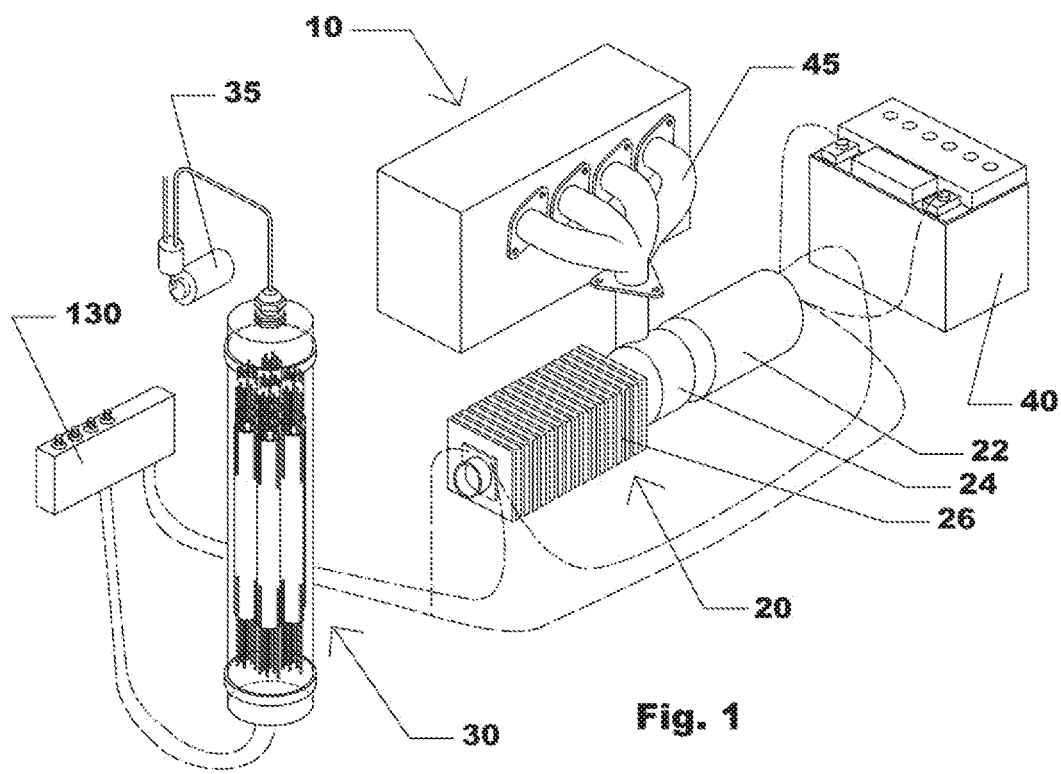
FIG. 1 shows an exploited view of the system for producing gases according to the present invention.
Figure 2:
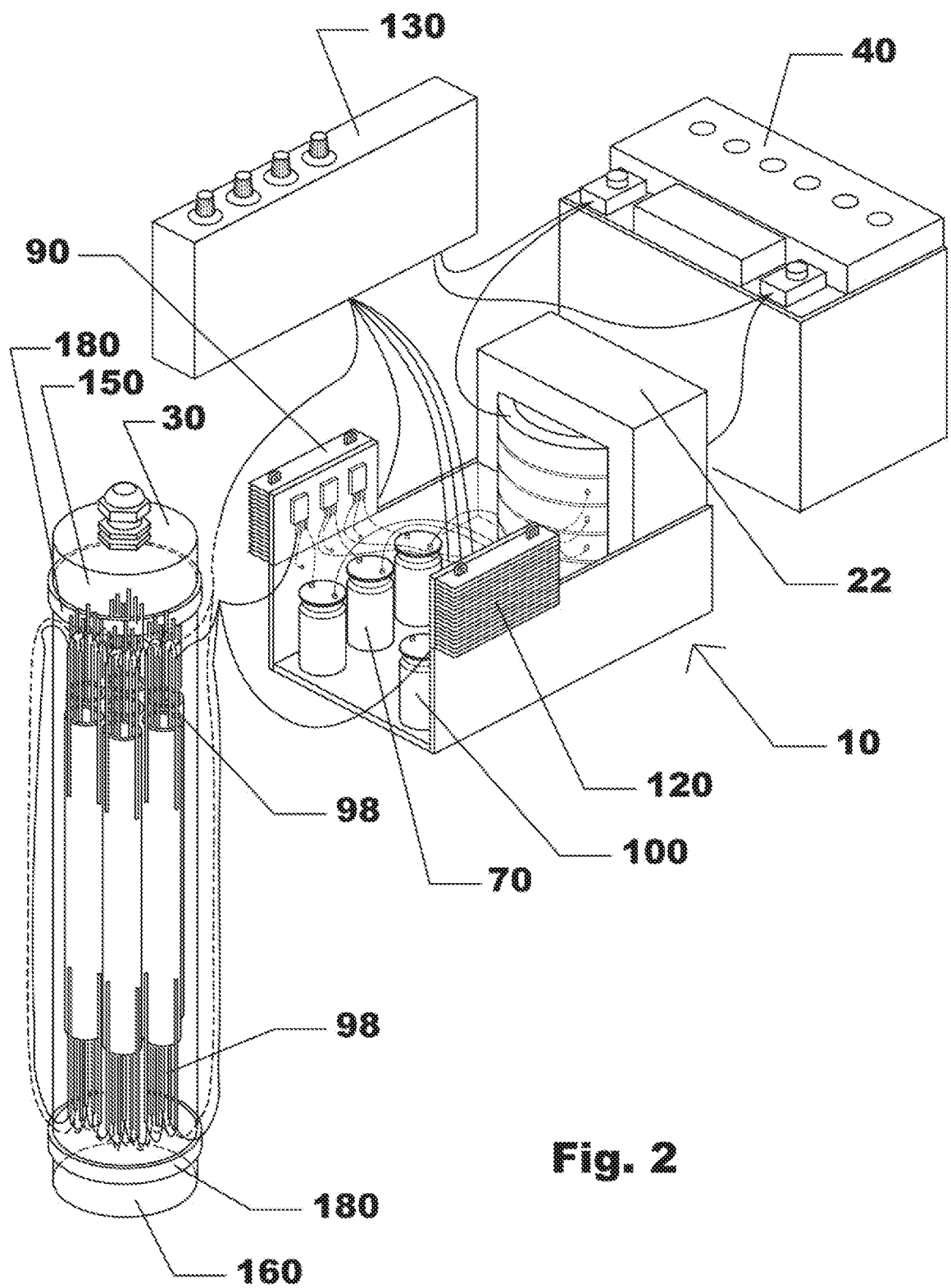
FIG. 2 shows an exploited view of the system for producing gases according to FIG. 1 showing a more detailed view of some of the components of the system.
Figure 3:
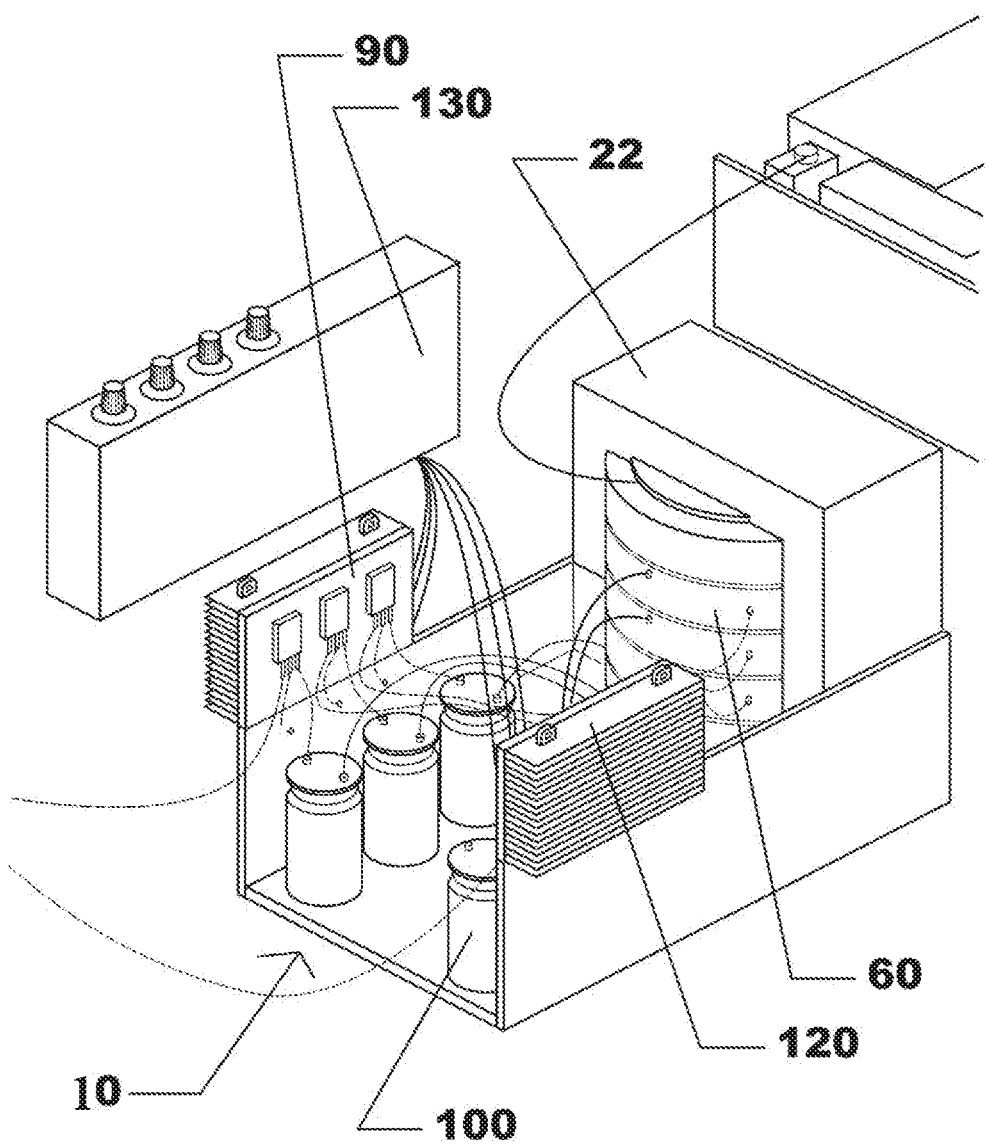
FIG. 3 shows a perspective front view of the dual arbitrary generator according to the present invention.
Figure 4:
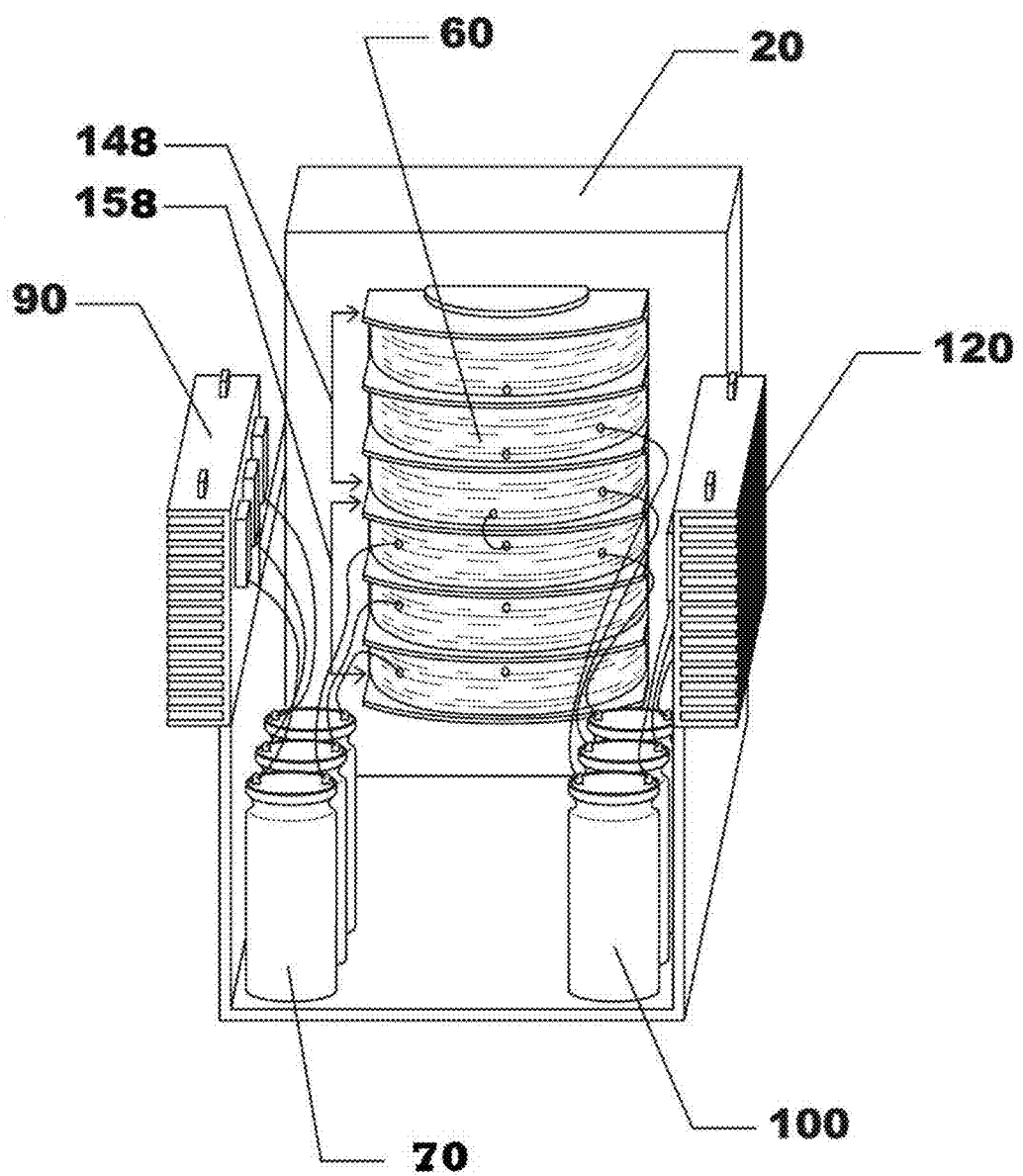
FIG. 4 shows a perspective front view of the primary winding device of the dual arbitrary generator of FIG. 3.
Figure 5:
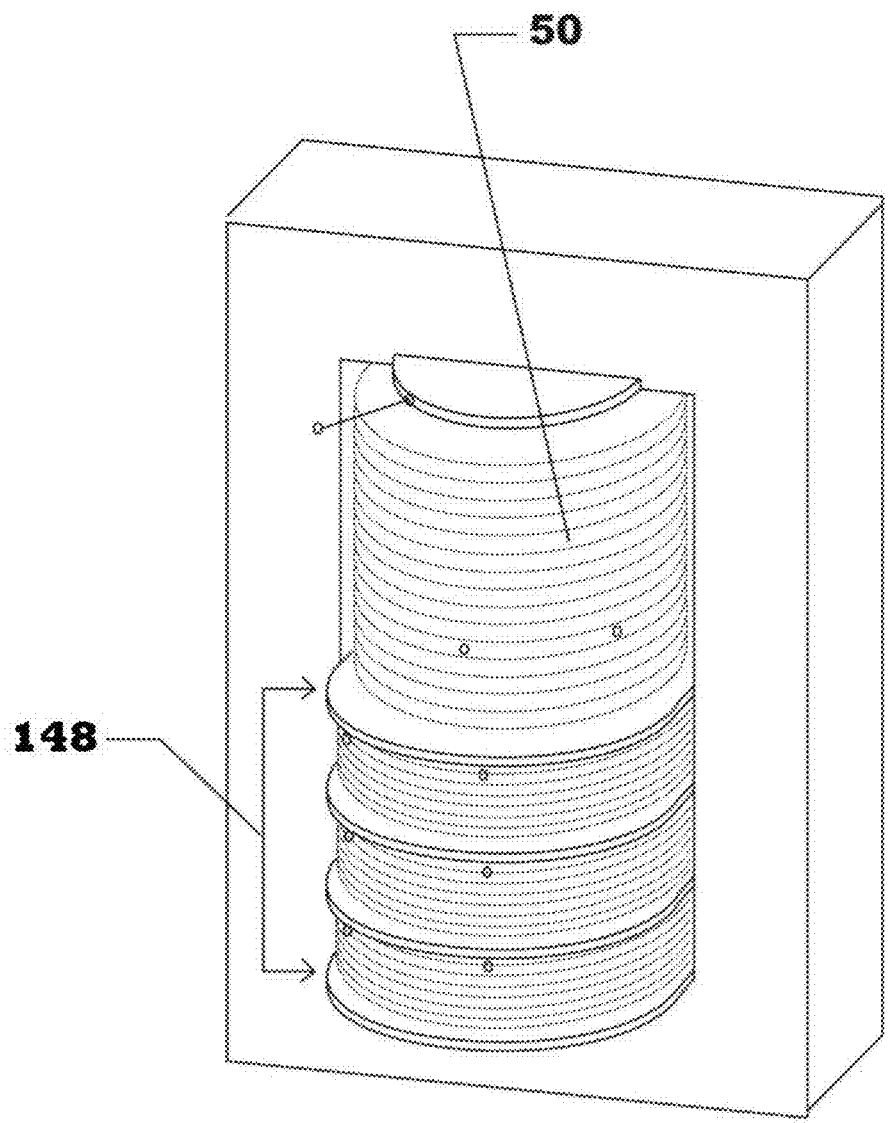
FIG. 5 shows a perspective front view of the secondary winding device of the dual arbitrary generator of FIG. 4.
Figure 6:
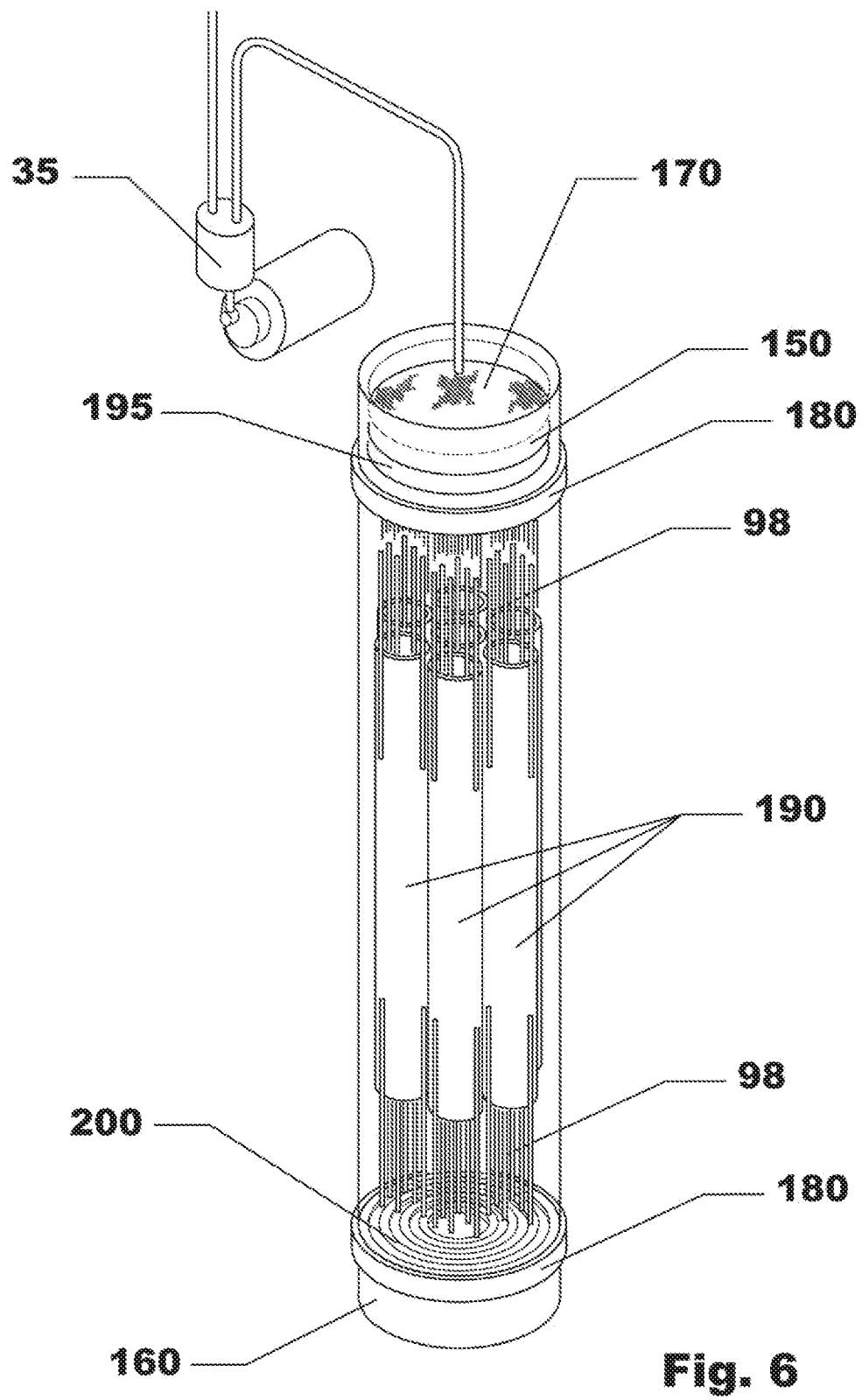
FIG. 6 shows a perspective front view of the radiolytic cell according to FIG. 1, showing the suction pump.
Figure 7:
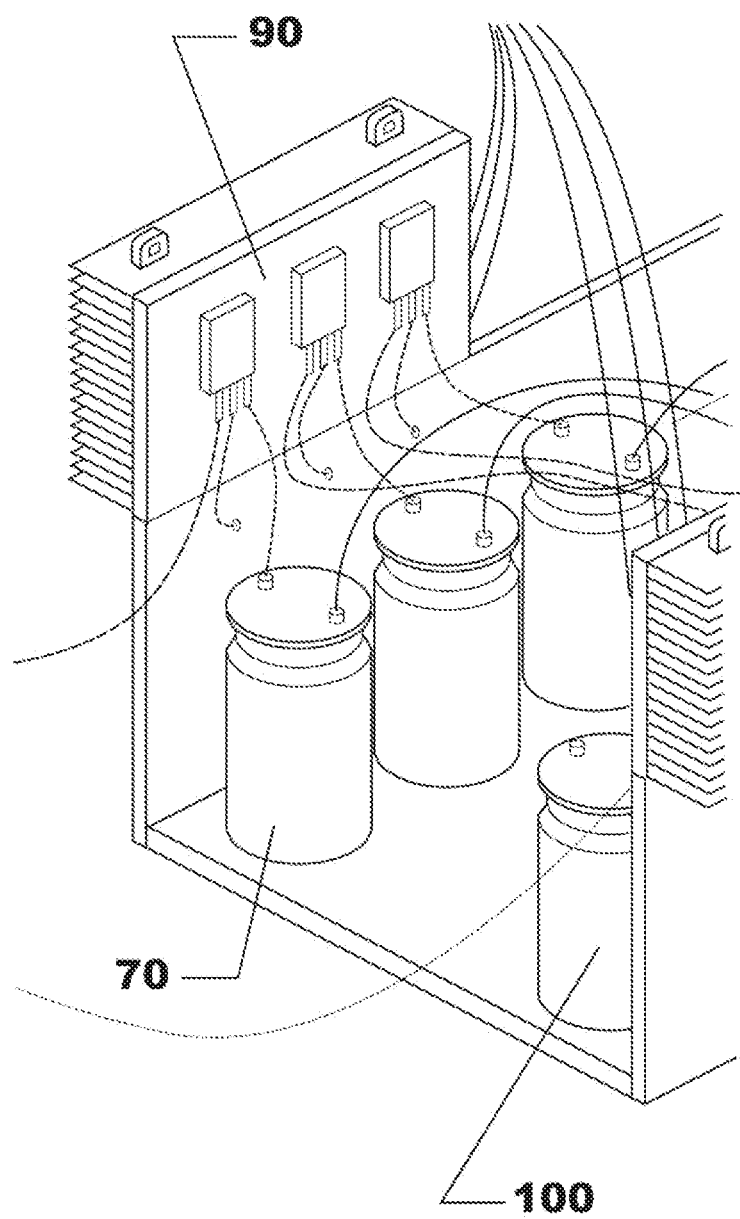
FIG. 7 shows a perspective detailed front view of the transistors of the dual arbitrary generator of FIG. 3.
Figure 8:
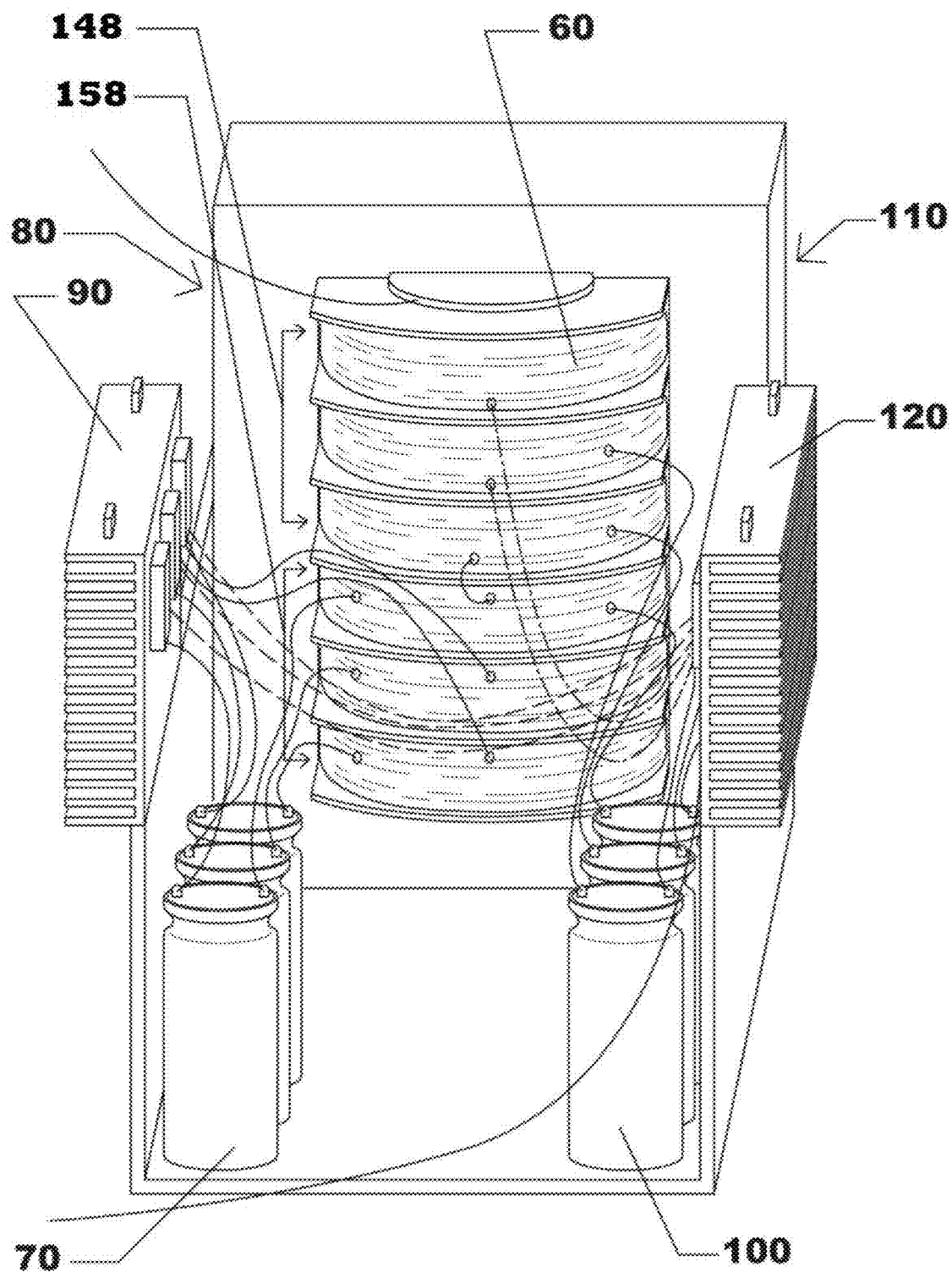
FIG. 8 shows a perspective detailed front view of the capacitors of the dual arbitrary generator of FIG. 3.
Figure 9:
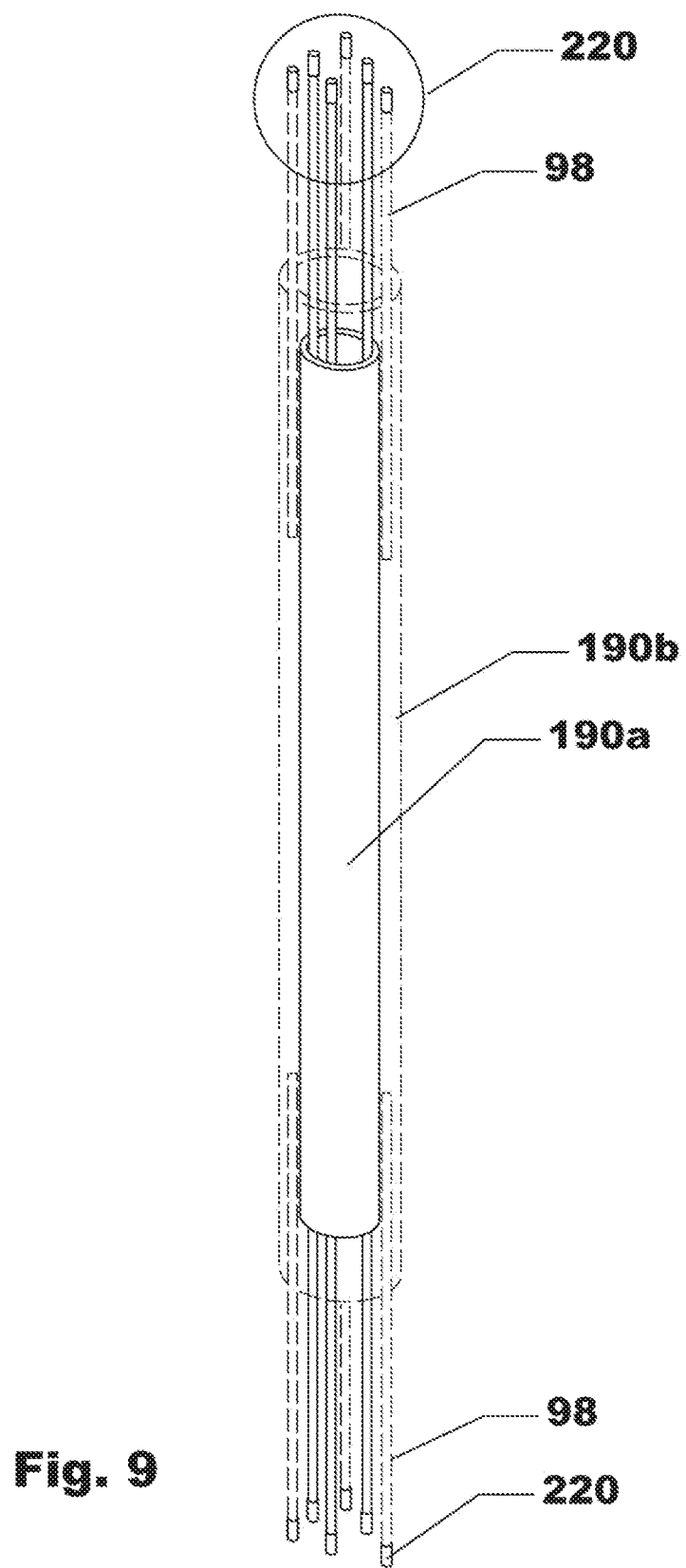
FIG. 9 shows a detailed view of the radiotrodes of the radiolytic cell according to FIG. 6, showing a more detailed view of the radiolytic cell including the metallic wires supporting the radiotrodes and electronic connection at the end of the wires.
Figure 10:
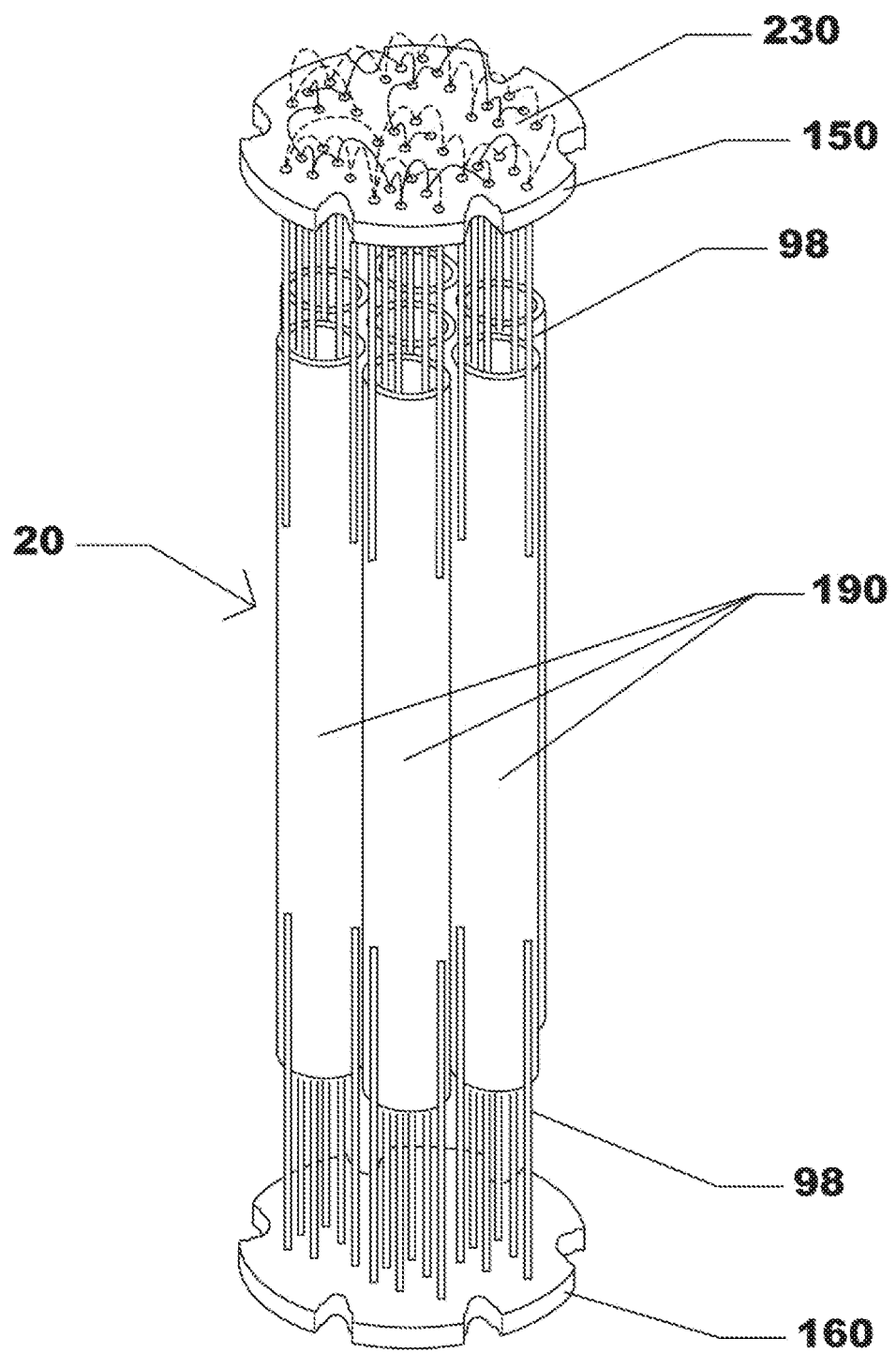
FIG. 10 shows a perspective front view of the radiolytic cell according to FIG. 6, showing the wires supporting the radiotrodes connected to the disk.
Figure 11:
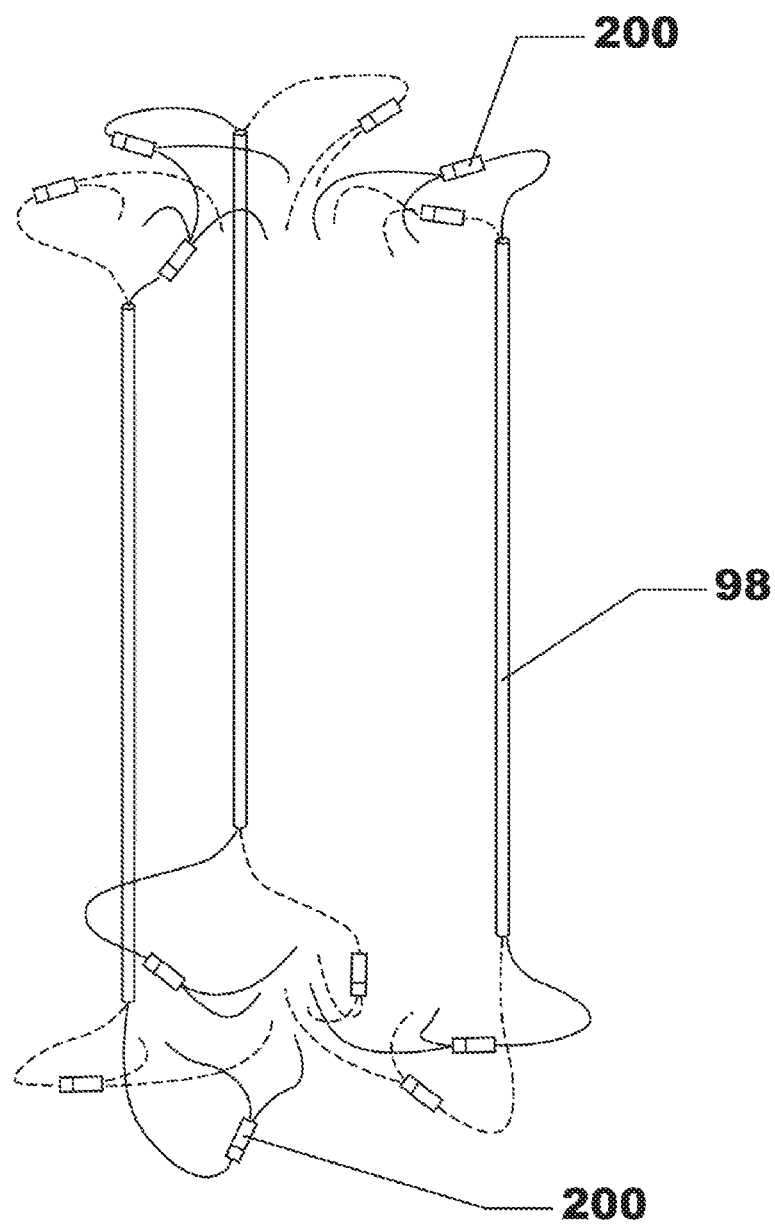
FIG. 11 shows a detailed view of the wires that support the radiotrodes.
Figure 12:
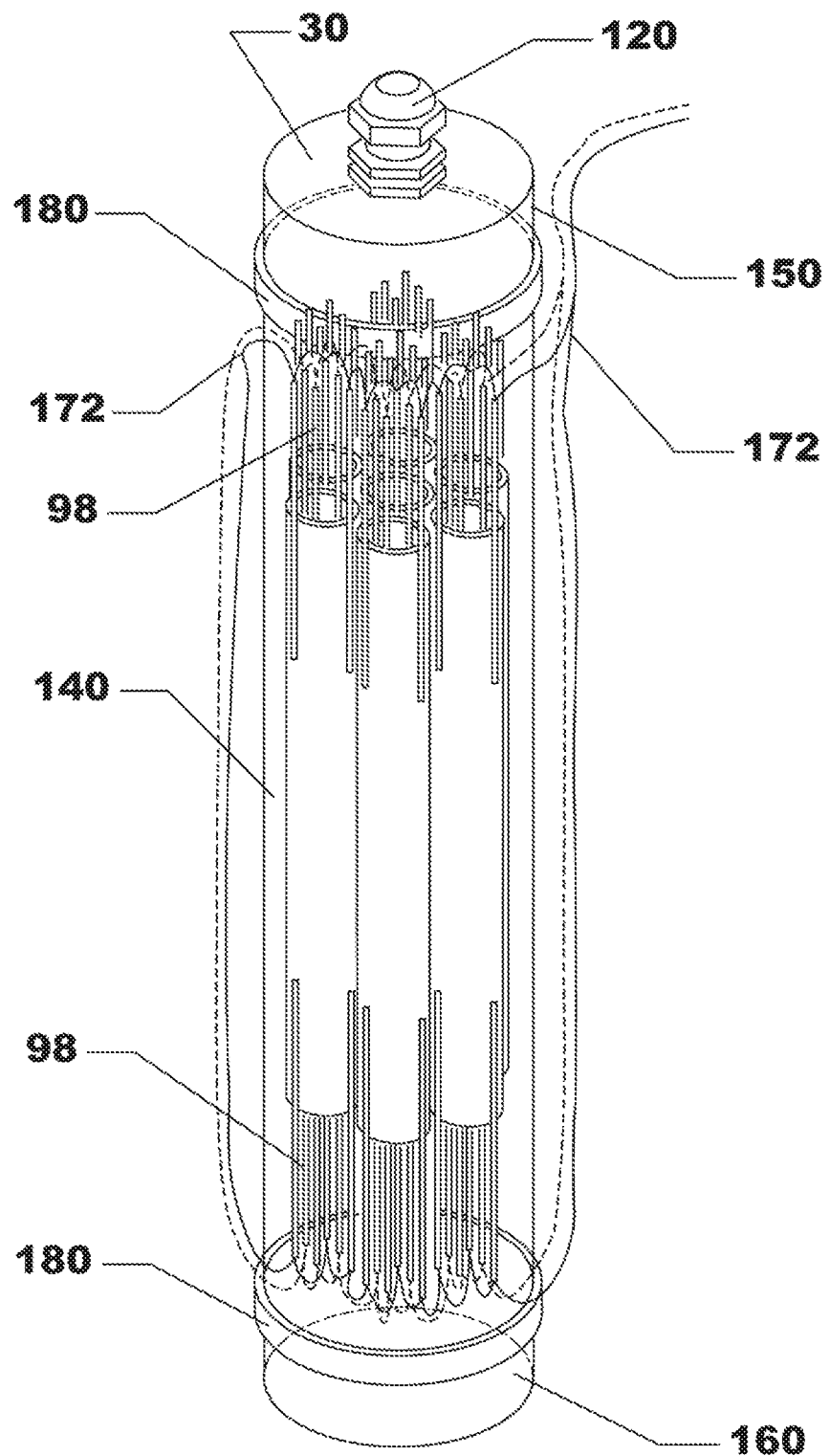
FIG. 12 shows a front view of the radiolytic cell according to FIG. 6.
Figure 13:
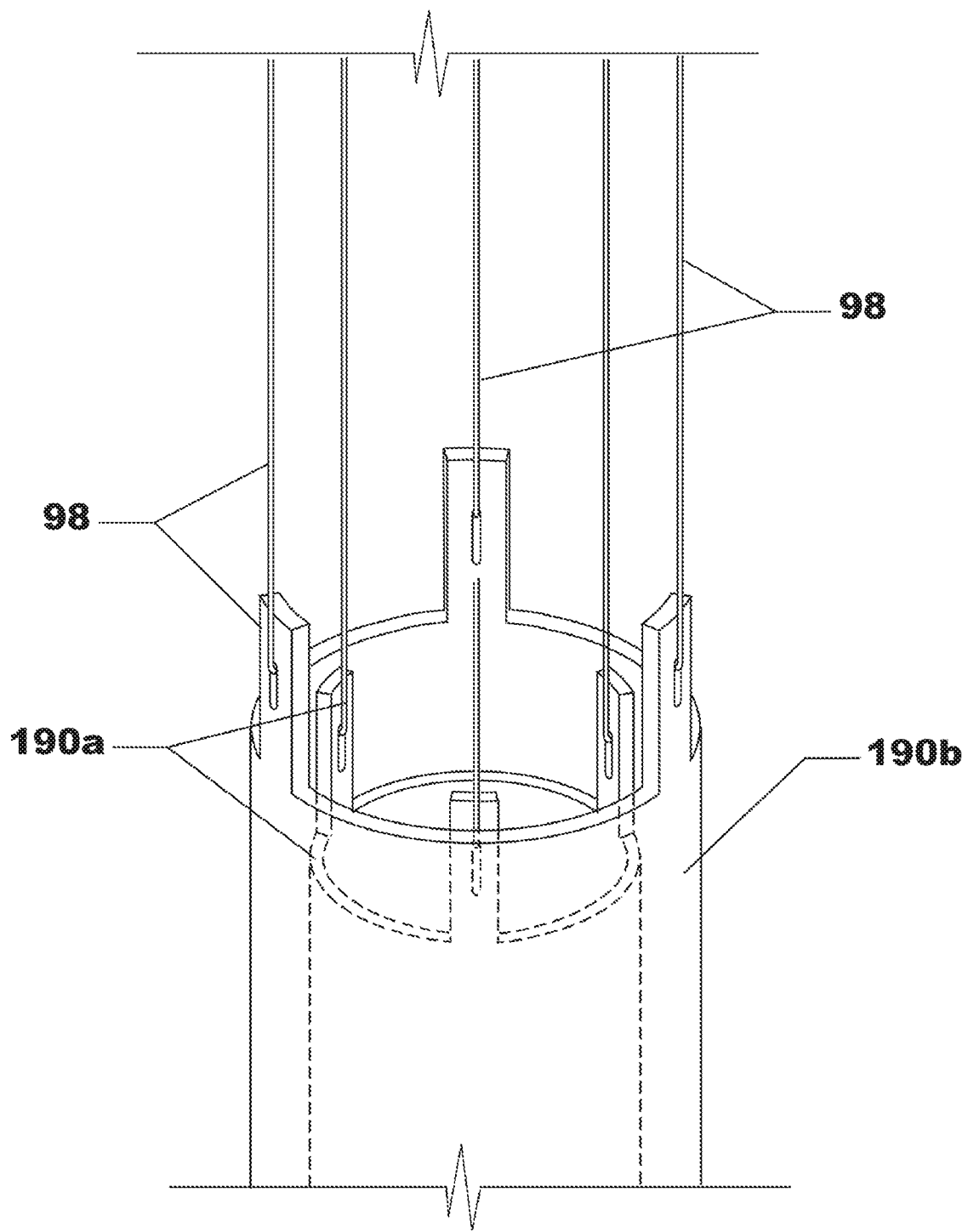
FIG. 13 shows a detailed view of the radiotrodes according to the present invention.
Figure 14:
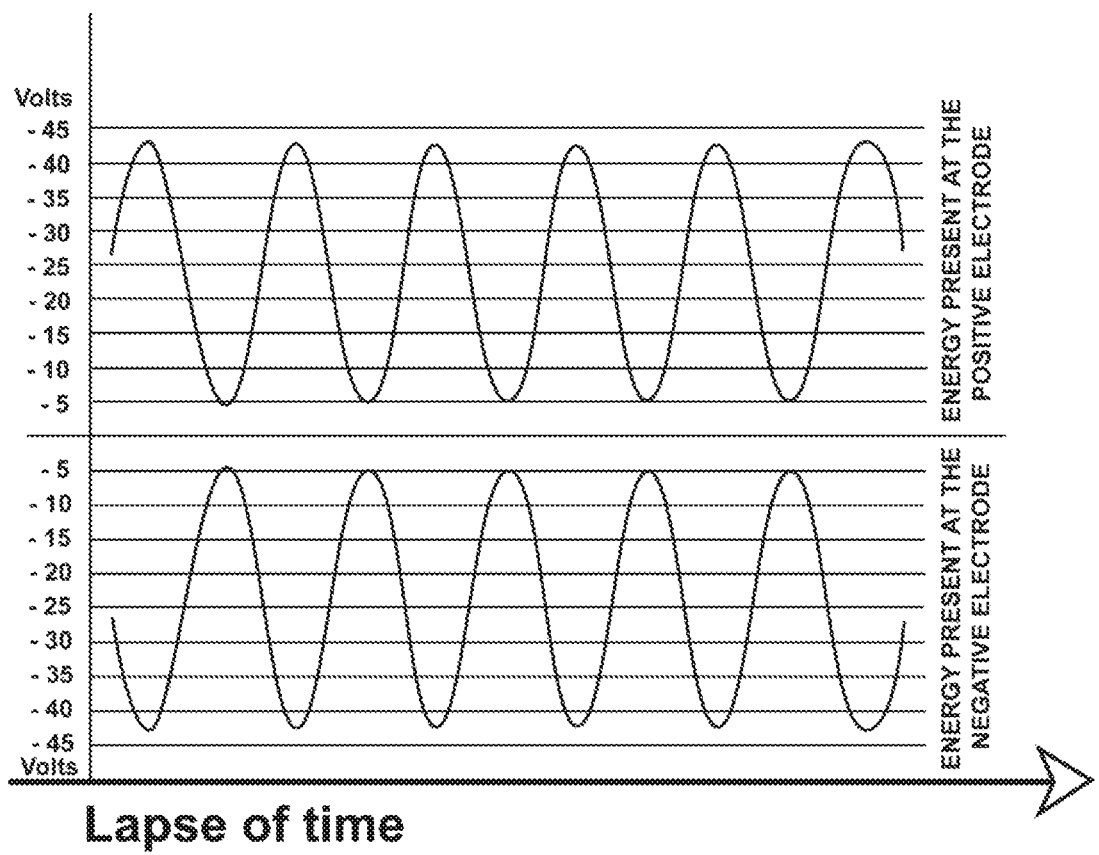
FIG. 14 shows a graph showing the waves produced by the dual arbitrary generator.

FIGS. 1-13 show the system 10 for producing gases according to the present invention. The system 10 comprises a dual arbitrary generator 20, a radiolytic cell 30, a suction pump 35 operatively connected to the radiolytic cell 30, a power source 40 including an electric circuit (not shown) to provide power to a generator 20; and a gas exhaust port for gases of a machine or engine 45.

The generator 20 uses the heat and the flow, current or circulation of the exhaust gases of the machine or engine 45, to generate electricity; which is used itself to produce radiolysis. The generator 20 may be, for example, an MTS electric turbo-compounding device by an MTS system; a combined heat and power device by Innovit; a KERS system, an MGU-K system, or an MGU-H system by Maximum Formula 1 Experience.

The generator 20 includes a dual arbitrary generator 22, a turbine 24, and a thermoelectric generator 26.

The turbine 24 receives the exhaust gas flow from the machine or engine 45, which drives the thermoelectric generator 26. The turbine may be, for example, an MGU-K Magnetic turbine by Magnet Marelli.

The dual arbitrary generator 22 includes a main winding device 50, a secondary winding device 60, a first set of capacitors 70 located on a first side 80 of the dual arbitrary generator 20, a first set of transistors 90 located on the first side 80 of the dual arbitrary generator 20, a second set of capacitors 100 located on a second side 110 of the dual arbitrary generator 20, a second set of transistors 120 located on the second side 110 of the dual arbitrary generator 20, and a pulse-width modulation device 130. The dual arbitrary generator 22 may be, for example, a AFG1000 arbitrary/function generator by Tektronix.

The dual arbitrary generator 22 receives continuous low voltage current from the power source 40 (battery) in the primary winding device 50 and then it moves to the secondary winding device 60. The secondary winding device 60 includes a set of 3 upper coils 148 and a set of lower coils 158. The set of 3 upper coils 148 and the set of lower coils 158 are identical.

The set of 3 upper coils 148 are connected to the first set of capacitors 70 and the first set of transistors 90. The set of 3 lower coils 158 are connected to the second set of capacitors 70 and the second set of transistors 90; thus, the set of 3 upper coils 148 move inverse to the set of lower coils 158.

While the transistors 90, 120 are open, all coil/capacitor assemblies are charged independently of each other. When transistors 90, 120 are closed, the upper and lower set of coils close and they cascade together adding up the energy stored in them to create a "high power" electric shock. One set of the coils generates a positive shock and the other set of coils generates a negative shock. When the transistors reopen, each set of coils is independently reloaded.

The pulse-width modulation device 130 creates the low voltage and current electrical pulses that when activated causes the transistors to be shut down. The pulse-width modulation device 130 reduces the average power delivered by an electrical signal, by effectively chopping it up into discrete parts. The pulse-width modulation device 130 includes knobs to adjust the working magnitudes to the required conditions, for example, these pulses are driven to the radiolytic cell 30.

Inside the radiolytic cell 30, electromagnetic and sonic forces are pulsating at a large number of times per second, breaking the bonds of the atoms of molecules, and generating gases that are drained through a port, arranged at the top of the vessel, by means of the suction pump 35 that releases the gases outward.

As can be seen in FIGS. 6, 9, 10, 11, 12, and 13, the radiolytic cell 30 includes a body 140 in the form of a hollow cylinder tube container. The body 140 is the cell container and has a first disk 150 on the upper end, and a second disk 160 on the lower end. The disks 150 and 160 includes a plurality of perforations 230 and are spaced apart from each other by about 20 inches.

A port 170 is located on the first disk 150 and at least two outlet ports 172 are located on the body 140. Magnets 180 are located on the upper end and the lower end of the body 140.

A plurality of radiotrodes 190 to produce the lysis of the liquid or solid are placed on the radiolytic cell 30 in addition to a third electrode 195 and an ionizing light emitting device 200.

The third electrode 195 is placed inside the radiolytic cell 30, at the top, which is where the generated gas arises. The third electrode 195 has a positive electrical charge, to absorb the free electrons from the generated gas stream to prevent the reunification.

The third electrode 195 is a perforated electrode or with grilles, which do not form or are near radiotrodes, tipping only an electrical polarity, arranged above the surface of the radiotrodes. The third electrode 195 picks up the free electrons from both the radiotrodes and the gas stream emanating from the radiotrodes and drains them.

The magnets 180 force the gas to emerge and migrate from the liquid or solid treated by magnetic attraction. The magnets 180 by their magnetic field, magnetic attraction, attract towards the generated gas, forcing it to emanate, emerging from the aqueous or solid element.

Each pole on the radiotrodes 190 emits on the opposite wave of its pair, producing the lysis of the molecules of the liquid or solid to be treated.

Each radiotrodes 190 include two concentric tubes, a large diameter tube 190$b$ and small diameter tube 190$a$.

Each one of the radiotrodes 190 have a plurality of thin metallic wires 98. The thin metallic wires 98 are arranged radially, in the direction of the diameter of the cell. Some of the thin metallic wires 98 are connected to an upper section of each one of the tubes 190$a$ and 190$b$ and some of the thin metallic wires 98 are connected to a lower section of each one of the tubes 190$a$ and 190$b$.

The smaller diameter tubes 190$a$ have a first end of the thin metallic wires 98 welded on their inner face. The large diameter tubes 190$b$ have a first end of the metallic wires 98 welded on the inner face.

The second end of each one of the thin metallic wires 98 is connected into the perforations 230 on the corresponding first disk 150 or the second disk 160.

Each thin metallic wires 98 includes an electronic connection 220 on each end. The electric connections 220 are interlocked into the perforations 230 on the disks 150, 160; thus, the radiotrodes 190 hangs inside the radiolytic cell 30. The function of the electric connections 220 are electric conductors. Each one of the electric connections 220 pass out of the body 140, through the perforations 230, and are adjusted to ensure the sealing of the radiolytic cell 30.

The tubes 190$a$, 190$b$ and the thin metallic wires 98 are made of metallic material, for example, aluminum, steel, nickel, or copper.

The tubes 190*a*, 190*b* behave like tubular bells, wind chimes or angel callers.

In the prior art, by holding firmly in position, the radiotrodes provides a limited freedom of movement.

On the contrary, on the present invention the action of electric shocks/magnetic fields, the tubes 190, 190*b* will mechanically vibrate. The mechanical vibration in the tubes 190*a* and 190*b*, is intended to disperse the ions detached from the treated liquid or solid. Preventing clumping from clumping into the surface of the radiotrodes 190.

In one embodiment, the tubes 190*a*, 190*b* and the thin metallic wires 98 may undergo a surface coating by a bath, a process of varnishing or painting, or surface oxidation, with a material that is electrically rigid: it does not conduct electricity, it is dielectric, insulating. Some of the coating materials may be, for example, silicone paints, glass coatings, or glaze.

The coating is intended to electrically seal the surface of the tubes 190*a*, 190*b*, and thin metallic wires 98, so that electricity does not flow freely from one radiotrodes to another, and then running through the treated liquid or solid.

The ionizing light emitting device 200 emits a light radiation of ionizing properties so that the radiation dispersed is blurred in the radiotrodes. Some of the spectra of this radiation has the property of energizing molecules of different materials, (liquid or solid). Not with the necessary force to produce the breaking of the molecules, but only to energize and catalyze the break with the electromagnetic radiation.

For a part to produce an electromagnetic/electromagnetic field, electricity must be able to be charged to it: at the same time, that electricity must be prevented from escaping it. Whether an electric arc, spark or by driving (moving to) surrounding elements by simple physical contact.

The purpose of this bath, varnished, painted or coated, is intended to isolate the part radiotrodes and wire, from the liquid or salt to be treated in the vat. Prevent the electricity from escaping these radiotrodes, making it accumulate (electricity) in them.

The more electricity (voltage) they accumulate (the radiotrodes) the stronger the electromagnetic/electrostatic fields that the radiotrodes produce.

The molecules of matter (solid liquids salts etc.), are flexible and dynamic structures, have their own natural and spontaneous movement. They also have dipolar ends: they have extremes of southern magnetic polarity, and extremes of northern magnetic polarity. These structures, (the molecules) vibrate, beat on their own, as a product of the interaction of the electrons that permanently run within them as orbitals.

The magnetic fields produced by the radiotrodes of the invention, exert opposite attraction on those polar ends of the molecules. The south poles of the radiotrodes pull towards themselves, the north poles of the molecules. The north poles of the radiotrodes pull towards themselves, the southern poles of the molecules. Eventually the phenomenon ends up breaking down the molecules producing the detachment of the atoms that make up the molecules. So those atoms make up a gas.

In previous art there is the traditional electrolysis technique that involves passing an electric current through a material (a gas, liquid salt, molten metals, etc.), to produce the rupture of its molecules. Using an electric current involves bombarding matter (a gas, liquid, salt, or molten metals) with infinite amount of broker electrons (electrons move). Electrons that when moving involve an electric current. An electric current, in turn, implies considerable electricity consumption. But, atoms (which form molecules), are actually structures in which 99% of the space they occupy is empty, and only 1% possess matter.

This follows that, when applying a current of electrons (an electric current), many of those electrons will pass through the atoms without producing or emerging any effect on it/the atoms.

It is understood that electrolysis is a very inefficient method, in which much of those electrons that were printed motion, in the end, achieve no effect.

In a given piece, radiotrodes in the case of the invention, the accumulation, and the lack of electrons, causes that around, (on the periphery) of the piece, magnetic/electrostatic fields are created. In the invention are the fields that are created in the radiotrodes, which produce the break of the molecules of matter (a gas, liquids, salts, or molten metals), that were processed in the cell.

The magnetic/electrostatic fields of the radiotrodes, of the invention, are not constant, or permanent. The magnetic/electrostatic fields of the radiotrodes of the invention, collapse (they are turned off), are recreated (they are restarted), hundreds and thousands of times per second.

It is mentioned above, that the electrons of molecules (within molecules) rotate naturally, spontaneously, in the form of orbits, in a circular form.

The magnetic/electrostatic fields, pulsating from the radiotrodes of the invention, cause the electrons of the molecules to accelerate their speed, until they finally gain so much inertia that they can no longer maintain their orbital path, and shoot out.

These radiotrodes are the ones that hold the different atoms together, which in turn form the molecules (from the liquid, the salt or whatever matter was to be treated in the cell).

The detail of the orbital acceleration of the electrons of molecules, and the use of magnetic/electrostatic fields, achieves superior efficiency, compared to the technique of previous art: the so-called electrolysis process. Efficiency in terms of energy used/amount of gas generated.

The invention is planned to be installed somewhere where there is a supply of electricity: a motor vehicle, agricultural machinery and equipment, generator set, a house, a factory, etc.

It will be appreciated that various above-disclosed and other features and functions, or alternatives thereof, may be desirably combined into many other different systems or applications. Also, that various presently unforeseen or unanticipated alternatives, modifications, variations or improvements therein may be subsequently made by those skilled in the art, which are also intended to be encompassed by the following claims.

The invention claimed is:

1. A system to generate gases from a liquid or a solid source comprising:

a generator adapted to be powered by a power source, the generator includes a dual arbitrary generator adapted to be connected to the power source, a turbine connected to the dual arbitrary generator and adapted to receive exhaust gas from a machine or a motor; and a thermoelectric generator connected on a first end to the turbine;

a pulse-width modulation device connected to the thermoelectric generator;

a radiolytic cell having a bottom end connected to a second end of the pulse-width modulation device, the radiolytic cell including a body in the form of a hollow cylinder tube, a first disk on an upper end of the body, a second disk on a lower end of the body, the first disk and the second disk include a plurality of perforations;

a suction pump connected to a top end of the radiolytic cell;

magnets located at the top and the bottom ends of the radiolytic cell;

wherein a plurality of radiotrodes are placed inside the body of the radiolytic cell, each radiotrodes includes a large diameter tube and a small diameter tube concentric with the large diameter tube, a first set of metallic wires having a first end fixed into an upper section of the large diameter tube and an upper section of the small diameter tube; a second set of metallic wires having a first end fixed to a lower section of the large diameter tube and to a lower section of the small diameter tube;

wherein a second end of each one of the metallic wires is connected into the perforations of the corresponding first disk or second disk:

wherein the radiotrodes hang up inside the radiolytic cells by the metallic wires producing movement or vibration of the radiotrodes inside the radiolytic cell;

each of the radiotrodes having first and second opposite poles, wherein each pole on each one of the radiotrodes emits a wave to attract the opposite pole of the radiotrodes, producing the lysis of molecules of the liquid or the solid.

2. The system according to claim 1, wherein the radiolytic cell further comprises an ionizing light emitting device located at the bottom end of the radiolytic cell.

3. The system according to claim 1, wherein the metallic wire includes an electronic connection on each end, wherein the electronic connections are interlocked into perforations on the first and second disks.

4. The system according to claim 1, wherein the radiotrodes are coated with a non-electrical conduction material.

5. The system according to claim 1, wherein the dual arbitrary generator includes at least two winding devices, at least two sets of coils, and at least two sets of capacitors, wherein each set of coils is connected to one of the two sets of capacitors.

\* \* \* \* \*